US012587675B2

(12) United States Patent
Babaeizadeh et al.

(10) Patent No.: US 12,587,675 B2
(45) Date of Patent: Mar. 24, 2026

(54) PIXEL-LEVEL VIDEO PREDICTION WITH IMPROVED PERFORMANCE AND EFFICIENCY

(71) Applicant: Google LLC, Mountain View, CA (US)

(72) Inventors: Mohammad Babaeizadeh, San Jose, CA (US); Chelsea Breanna Finn, Palo Alto, CA (US); Dumitru Erhan, San Francisco, CA (US); Mohammad Taghi Saffar, Santa Clara, CA (US); Sergey Vladimir Levine, Berkeley, CA (US); Suraj Nair, Stanford, CA (US)

(73) Assignee: GOOGLE LLC, Mountain View, CA (US)

( * ) Notice: Subject to any disclaimer, the term of this patent is extended or adjusted under 35 U.S.C. 154(b) by 300 days.

(21) Appl. No.: 18/011,922

(22) PCT Filed: May 27, 2022

(86) PCT No.: PCT/US2022/031326
§ 371 (c)(1),
(2) Date: Dec. 21, 2022

(87) PCT Pub. No.: WO2022/251621
PCT Pub. Date: Dec. 1, 2022

(65) Prior Publication Data
US 2023/0239499 A1     Jul. 27, 2023

Related U.S. Application Data

(60) Provisional application No. 63/194,457, filed on May 28, 2021.

(51) Int. Cl.
*H04N 19/105*        (2014.01)
*G06V 10/70*         (2022.01)
(Continued)

(52) U.S. Cl.
CPC ............ *H04N 19/59* (2014.11); *G06V 10/70* (2022.01); *H04N 19/117* (2014.11); *H04N 19/176* (2014.11); *H04N 19/42* (2014.11)

(58) Field of Classification Search
CPC .... H04N 19/105; H04N 19/593; H04N 19/59; H04N 19/46
See application file for complete search history.

(56) References Cited

U.S. PATENT DOCUMENTS 10,015,510 B1 * 7/2018 Navarrete Michelini ................... H04N 19/90
10,200,618 B2 * 2/2019 Carr ........................ G06T 7/277
(Continued)

OTHER PUBLICATIONS

_ RadAument, practical automated data augment with reduced search space; Cubuk—2019; (Year: 2019).*
(Continued)

*Primary Examiner* — Luis Perez-Fuentes
(74) *Attorney, Agent, or Firm* — DORITY & MANNING P.A.

(57)        ABSTRACT

One aspect provides a machine-learned video prediction model configured to receive and process one or more previous video frames to generate one or more predicted subsequent video frames, wherein the machine-learned video prediction model comprises a convolutional variational auto encoder, and wherein the convolutional variational auto encoder comprises an encoder portion comprising one or more encoding cells and a decoder portion comprising one or more decoding cells.

23 Claims, 10 Drawing Sheets

(51) Int. Cl.

| | | |
|---|---|---|
| *H04N 19/117* | (2014.01) | |
| *H04N 19/176* | (2014.01) | |
| *H04N 19/42* | (2014.01) | |
| *H04N 19/59* | (2014.01) | |

(56) References Cited

U.S. PATENT DOCUMENTS

| | | | | |
|---|---|---|---|---|
| 10,474,160 | B2 * | 11/2019 | Huang | G06V 10/82 |
| 10,499,069 | B2 * | 12/2019 | Wang | G06T 5/70 |
| 10,565,499 | B2 * | 2/2020 | Bourdev | G06V 30/19147 |
| 10,681,380 | B2 * | 6/2020 | Terada | H04N 19/82 |
| 10,701,394 | B1 * | 6/2020 | Caballero | G06N 3/045 |
| 10,997,433 | B2 * | 5/2021 | Xu | G06V 20/41 |
| 11,173,599 | B2 * | 11/2021 | Levine | B25J 9/1697 |
| 11,228,767 | B2 * | 1/2022 | Hannuksela | H04N 19/30 |
| 11,234,006 | B2 * | 1/2022 | Wang | G06T 3/4053 |
| 11,528,492 | B2 * | 12/2022 | Wang | G06N 3/044 |
| 11,551,357 | B2 * | 1/2023 | Locke | G06T 11/001 |
| 11,582,470 | B2 * | 2/2023 | Jiang | H04N 19/593 |
| 11,601,644 | B2 * | 3/2023 | Mukherjee | G06N 20/00 |
| 11,616,960 | B2 * | 3/2023 | Chou | H04N 19/86 382/157 |
| 11,627,328 | B2 * | 4/2023 | Xu | H04N 19/132 375/240.25 |
| 11,823,350 | B2 * | 11/2023 | Yin | H04N 19/14 |
| 12,033,302 | B2 * | 7/2024 | Tang | G06N 3/09 |
| 12,141,700 | B2 * | 11/2024 | Murray | G06N 3/084 |
| 12,468,952 | B2 * | 11/2025 | Li | G06N 3/045 |
| 2018/0184123 | A1 * | 6/2018 | Terada | G06T 9/002 |
| 2021/0092479 | A1 * | 3/2021 | Namba | G06V 10/764 |

OTHER PUBLICATIONS

_ A modular Neural Network vector predictor for predictive image coding; Wang—1990; (Year: 1990).*
_ Learning models for video quality prediction: Khan~ 2010: (Year: 2010).*
_ Deeper depth prediction with fully convolutional residual networks; Laina—2016; (Year: 2016).*
_ Up-sampling with a fixed order in MIP; Liu; et al. Oct. 2019 (Year: 2019).*
_ Iterative learning with open-set noise labels; Mar. 2018. (Year: 2018).*
International Preliminary Report on Patentability for Application No. PCT/US2022/031326, mailed Dec. 7, 2023, 11 pages.
Babaeizadeh et al, "Stochastic Variational Video Prediction", arXiv:1710.11252v2, Mar. 6, 2018, 16 pages.
Denton et al, "Stochastic Video Generation with a Learner Prior", arXiv:1802.07687v2, Mar. 2, 2018, 12 pages.
Dosovitskiy et al, "Generating Images with Perceptual Similarity Metrics based on Deep Networks", arXiv:1602.02644v2, Feb. 9, 2016, 14 pages.
Gao et al, "Future Frame Prediction for Robot-assisted Surgery", arXiv:2103.10308v1, Mar. 18, 2021, 12 pages.
International Search Report for Application No. PCT/ US2022/031326, mailed on Aug. 29, 2022, 2 pages.
Mohammad Babaeizadeh et al, "FitVid: Overfitting in Pixel-Level Video Prediction", arXiv:2106.13195v1, Jun. 24, 2021, 26 pages.
Vahdat et al, "NVAE: A Deep Hierarchical Variational Autoencoder", arXiv:2007.03898v3, Jan. 8, 2021, 22 pages.
Amersfoort et al., "Transformation-Based Models Of Video Sequences", arXiv:1701.08435v3, Feb. 6, 2023, 11 pages.
Babaeizadeh et al., "Models, Pixels, and Rewards: Evaluating Design Trade-Offs in Visual Model-Based Reinforcement Learning", arXiv:2013.04603v1, Dec. 8, 2020, 24 pages.
Bengio et al., "Scheduled Sampling for Sequence Prediction with Recurrent Neural Networks", arXiv:1506.03099v3, Sep. 23, 2015, 9 pages.
Boots et al., "Learning Predictive Models of a Depth Camera & Manipulator from Raw Execution Traces", IEEE International Conference on Robotics and Automation (ICRA), 2014, 8 pages.

Brabandere et al., "Dynamic Filter Networks", arXiv:1605.09673v1, May 31, 2016, 13 pages.
Brown et al., "Language Models are Few-Shot Learners", arXiv:2005.14165v4, Jul. 22, 2020, 75 pages.
Bubic et al., "Prediction, Cognition and the Brain", Frontiers in Human Neuroscience, vol. 4, No. 25, Mar. 22, 2010, 15 pages.
Byravan et al., "Se3-Nets: Learning Rigid Body Motion using Deep Neural Networks", arXiv:1606.02378v3, Mar. 30, 2017, 8 pages.
Castrejon et al. "Improved Conditional VRNNs for Video Prediction", IEEE/CVF International Conference on Computer Vision, 2019, 10 pages.
Cenzato et al., "On the Difficulty of Learning and Predicting the Long-term Dynamics of Bouncing Objects", arXiv:1907.13494v1, Jul. 31, 2019, 14 pages.
Chen et al., "Video Imagination from a Single Image with Transformation Generation", arXiv:1706.04124v2, Jun. 15, 2017, 9 pages.
Chung et al., "A Recurrent Latent Variable Model for Sequential Data", arXiv:1506.02216v1, Jun. 7, 2015, 9 pages.
Clark et al., "Adversarial Video Generation on Complex Datasets", arXiv:1907.06571v2, Sep. 25, 2019, 21 pages.
Dasari et al., "Robonet: Large-Scale Multi-Robot Learning", arXiv:1910.11215v1, Oct. 24, 2019, 13 pages.
Devlin et al., "Bert: Pre-training of Deep Bidirectional Transformers for Language Understanding", arXiv:1810.04805v1, Oct. 11, 2018, 14 pages.
Dinh et al., "Density Estimation Using Real NVP", arXiv:1605.08803v1, May 27, 2016, 29 pages.
Dinh et al., "NICE: Non-Linear Independent Components Estimation", arXiv:1410.8516v6, Apr. 10, 2014, 13 pages.
Dorkenwald et al., "Stochastic Image-to-Video Synthesis using cINNs", arXiv:2105.04551v1, May 10, 2021, 18 pages.
Ebert et al., "Robustness via Retrying: Closed-Loop Robotic Manipulation with Self-Supervised Learning" arXiv:1810.03043v1, Oct. 6, 2018, 12 pages.
Ebert et al., "Self-Supervised Visual Planning with Temporal Skip Connections", arXiv:1710.05268v1, Oct. 15, 2017, 13 pages.
Ebert et al., "Visual Foresight: Model-Based Deep Reinforcement Learning for Vision-Based Robotic Control", arXiv:1812.00568v1, Dec. 3, 2018, 14 pages.
Endo et al., "Animating Landscape: Self-Supervised Learning of Decoupled Motion and Appearance for Single-Image Video Synthesis", arXiv:1910.07192v1, Oct. 16, 2019, 19 pages.
Finn et al. "Deep Spatial Autoencoders for Visuomotor Learning"; arXiv:1509.06113v3, Mar. 1, 2016, 9 pages.
Finn et al., "Deep Visual Foresight for Planning Robot Motion", arXiv:1610.00696v2, Mar. 13, 2017, 8 pages.
Finn et al., "Unsupervised Learning for Physical Interaction Through Video Prediction", 30th Conference on Neural Information Processing Systems, 2016, Barcelona, Spain, 9 pages.
Franceschi et al., "Stochastic Latent Residual Video Prediction", arXiv:2002.09219v4, Aug. 7, 2020, 30 pages.
Geiger et al., "Vision Meets Robotics: The Kitti Dataset", The International Journal of Robotics Research, vol. 32, No. 11, Aug. 23, 2013, 8 pages.
Github, "Flax: A Neural Network Library and Ecosystem for JAX Designed for Flexibility", 2020, http://github.com/google/flax, retrieved on Sep. 15, 2025, 6 pages.
Github, "JAX: Composable Transformations of Python+NumPy Programs: Differentiate, Vectorize, JIT to GPU/TPU, and More", 2018, http://github.com/google/jax, retrieved on Sep. 10, 2025, 7 pages.
Goodfellow et al., "Deep Learning", The MIT Press, Cambridge, Massachusetts, USA, 2016, 351 pages.
Goodfellow et al., "Generative Adversarial Networks", arXiv:1406.2661v1, Jun. 10, 2014, 9 pages.
Goodfellow et al., "NIPS 2016 Tutorial: Generative Adversarial Networks" arXiv:1701.00160v1, Dec. 31, 2016, 57 pages.
Guen et al., "Disentangling Physical Dynamics from Unknown Factors for Unsupervised Video Prediction", IEEE/CVF Conference on Computer Vision and Pattern Recognition, 2020, 11 pages.
Hafner et al., "Dream to Control: Learning Behaviors by Latent Imagination", arXiv:1912.01603v1, Dec. 3, 2019, 19 pages.

(56)            References Cited

OTHER PUBLICATIONS

Hafner et al., "Learning Latent Dynamics for Planning from Pixels", arXiv:1811.04551v1, Nov. 12, 2018, 17 pages.
Higgins et al. "Beta-VAE: Learning Basic Visual Concepts with A Constrained Variational Framework", International Conference on Learning Representations (ICLR), 2017, 22 pages.
Higgins et al., "Early Visual Concept Learning with Unsupervised Deep Learning", arXiv:1606.05579v1, Jun. 17, 2017, 12 pages.
Hochreiter et al., "Long Short-Term Memory", Neural Computation, vol. 9, No. 8, 1997, 32 pages.
Hu et al., "Squeeze-and-Excitation Networks", IEEE Conference on Computer Vision and Pattern Recognition, 2018, 10 pages.
Huynh-Thu et al., "Scope of Validity of PSNR in Image/Video Quality Assessment", Electronics Letters, vol. 44, No. 13, Jun. 19, 2008, 2 pages.
Ioffe et al., "Batch Normalization: Accelerating Deep Network Training by Reducing Internal Covariate Shift", arXiv:1502.03167v3, Mar. 2, 2015, 11 pages.
Ionescu et al., "Human3. 6M: Large Scale Datasets and Predictive Methods for 3D Human Sensing in Natural Environments", IEEE Transactions on Pattern Analysis and Machine Intelligence, 2014, 15 pages.
Jordan et al., "An Introduction to Variational Methods for Graphical Models", Machine Learning, vol. 37, 1999, 51 pages.
Kaiser et al., "Model Based Reinforcement Learning for Atari", arXiv:1903.00374v5, Apr. 3, 2024, 28 pages.
Kalchbrenner et al., "Video Pixel Networks", arXiv:1610.00527v1, Oct. 3, 2016, 16 pages.
Karras et al., "Progressive Growing of GANs for Improved Quality, Stability, and Variation", arXiv:1710.10196v2, Nov. 3, 2017, 25 pages.
Kim et al., "DriveGAN: Towards a Controllable High-Quality Neural Simulation", arXiv:2104.15060v1, Apr. 30, 2021, 16 pages.
Kim et al., "Learning to Simulate Dynamic Environments with GameGAN", arXiv:2005.12126v1, May 25, 2020, 16 pages.
Kingma et al., "ADAM: A Method for Stochastic Optimization", arXiv:1412.6980v9, Jan. 30, 2017, 15 pages.
Kingma et al., "Auto-Encoding Variational Bayes", arXiv:1312.6114v11, Dec. 10, 2022, 14 pages.
Kumar et al., "VideoFlow: A Flow-Based Generative Model for Video", arXiv:1903.01434vl, Mar. 4, 2019, 13 pages.
Lee et al. "Revisiting Hierarchical Approach for Persistent Long-Term Video Prediction", arXiv:2104.06697v1, Apr. 14, 2021, 27 pages.
Lee et al., "Stochastic Adversarial Video Prediction", arXiv:1804.01523v1. Apr. 4, 2018, 26 pages.
Liang et al., "Dual Motion GAN for Future-Flow Embedded Video Prediction", arXiv:1708.00284v2, Aug. 3, 2017, 9 pages.
Lin et al., "Motion-Aware Feature Enhancement Network for Video Prediction", IEEE Transactions on Circuits and Systems for Video Technology, vol. 31, No. 2, Feb. 2021, 13 pages.
Liu et al., "Video Frame Synthesis using Deep Voxel Flow", arXiv:1702.02463v2, Aug. 5, 2017, 9 pages.
Lu et al., "Flexible Spatio-Temporal Networks for Video Prediction", IEEE Conference on Computer Vision and Pattern Recognition, 2017, 9 pages.
Luc et al., "Transformation-based Adversarial Video Prediction on Large-Scale Data", arXiv:2003.04035v1, Mar. 9, 2020, 15 pages.
Mathieu et al., "Deep Multi-Scale Video Prediction Beyond Mean Square Error", arXiv:1511.05440v3, Nov. 23, 2015, 11 pages.
Minderer et al., Unsupervised Learning of Object Structure and Dynamics from Videos, arXiv:1906.07889v3, Mar. 2, 2020, 20 pages.
Nair et al., "Hierarchical Foresight: Self-Supervised Learning of Long-Horizon Tasks Via Visual Subgoal Generation", arXiv:1909.05829v1, Sep. 12, 2019, 16 pages.
Nair et al., "TRASS: Time Reversal as Self-Supervision", 2020 IEEE International Conference on Robotics and Automation (ICRA), May 31-Aug. 31, 2020, Paris, France, 7 pages.

Nam et al., "End-to End Time-Lapse Video Synthesis from a Single Outdoor Image", arXiv:1904.00680v1, Apr. 1, 2019, 10 pages.
Oh et al., "Action-Conditional Video Prediction using Deep Networks in Atari Games", arXiv:1507.08750v2, Dec. 22, 2015, 26 pages.
Paxton et al., "Visual Robot Task Planning", arXiv:1804.00062v1, Mar. 30, 2018, 8 pages.
Rakhimov et al., "Latent Video Transformer", arXiv:2006.10704v1, Jun. 18, 2020, 18 pages.
Ramachandran et al., "Searching for Activation Functions", arXiv:1710.05941v2, Oct. 27, 2017, 13 pages.
Ranzato et al., "Video (Language) Modeling: A Baseline for Generative Models of Natural Videos", arXiv:1412.6604v2, Dec. 24, 2014, 15 pages.
Reed et al., "Parallel Multiscale Autoregressive Density Estimation", arXiv:1703.03664v1, Mar. 10, 2017, 16 pages.
Rezende et al., "Stochastic Backpropagation and Approximate Inference in Deep Generative Models", arXiv:1401.4052v3, May 30, 2014, 14 pages.
Rubinstein, "Optimization of Computer Simulation Models with Rare Events", European Journal of Operational Research, vol. 99, 1997, 24 pages.
Saito et al., "Efficient Training of Large Models for Video Generation with Multiple Subsampling Lavers", arXiv:1811.09245v1, Nov. 22, 2018, 12 pages.
Saxena et al., "Clockwork. Variational Autoencoders for Video Prediction", arXiv:2102.09532v2, Feb. 20, 2021, 17 pages.
Shu et al., "Stochastic Video Prediction with Conditional Density Estimation", ECCV Workshop on Action and Anticipation for Visual Learning, 2016, 3 pages.
Srivastava et al., "Unsupervised Learning Of Video Representations Using LSTMs", arXiv:1502.04681v3, Jan. 4, 2016, 12 pages.
Unterthiner et al., "Towards Accurate Generative Models of Video: A New Metric & Challenges", arXiv:1812.01717v2, Mar. 27, 2019, 17 pages.
Villegas et al., "High Fidelity Video Prediction with Large Stochastic Recurrent Neural Networks", 33$^{rd}$ Conference on Neural Information Processing Systems (NeurIPS), 2019, Vancouver, Canada, 11 pages.
Villegas et al., "Learning to Generate Long-Term Future via Hierarchical Prediction", arXiv:1704.05831v4, Aug. 13, 2017, 21 pages.
Vondrick et al., "Generating the Future with Adversarial Transformers", IEEE Conference on Computer Vision and Pattern Recognition, 2017, 9 pages.
Vondrick et al., "Generating Videos with Scene Dynamics", arXiv:1609.02612v3, Oct. 26, 2016, 10 pages.
Walker et al., "An Uncertain Future: Forecasting from Static Images Using Variational Autoencoders", arXiv:1606.07873v1, Jun. 25, 2016, 17 pages.
Walker et al., "Dense Optical Flow Prediction from a Static Image", IEEE International Conference on Computer Vision, 2015, 9 pages.
Walker et al., "Predicting Video with VQVAE", arXiv:2103.01950v1, Mar. 2, 2021, 13 pages.
Wang et al., "Few-Shot Video-to-Video Synthesis", arXiv:1910.12713v1, Oct. 28, 2019, 14 pages.
Wang et al., "Image Quality Assessment: From Error Visibility to Structural Similarity", IEEE Transactions On Image Processing, vol. 13, No. 4, Apr. 2004, 14 pages.
Wang et al., "Memory In Memory: A Predictive Neural Network for Learning Higher-Order Non-Stationarity from Spatiotemporal Dynamics", IEEE/CVF Conference on Computer Vision and Pattern Recognition, 2019, 9 pages.
Wang et al., "Video-to-Video Synthesis", arXiv:1808.06601v2, Dec. 3, 2018, 14 pages.
Weissenborn et al., "Scaling Autoregressive Video Models", arXiv:1906.02634v1, Jun. 6, 2019, 22 pages.
Wichers et al., "Hierarchical Long-Term Video Prediction Without Supervision", arXiv:1806.04768v1, Jun. 12, 2018, 9 pages.
Wolf et al., "Huggingface's Transformers: State-of-the-Art Natural Language Processing", arXiv:1910.03771v3, Oct. 16, 2019, 11 pages.
Wu et al., "GODIVA: Generating Pen-Domain Videos from Natural Descriptions", arXiv:2104.14806v1, Apr. 30, 2021, 12 pages.

(56)                          References Cited

OTHER PUBLICATIONS

Wu et al., "Greedy Hierarchical Variational Autoencoders for Large-Scale Video Prediction" arXiv:2103.04174v3, Jun. 19, 2021, 22 pages.

Wu et al., "MotionRNN: A Flexible Model for Video Prediction with Spacetime-Varying Motions", arXiv:2103.02243v3, Jul. 8, 2021, 12 pages.

Xie et al., "Improvisation Through Physical Understanding: Using Novel Objects as Tools with Visual Foresight", Robotics: Science and Systems (RSS), Jun. 22-26, 2019, Freiburg im Breisgau, Germany, 10 pages.

Xue et al., "Visual Dynamics: Probabilistic Future Frame Synthesis via Cross Convolutional Networks", Advances in Neural Information Processing Systems, 2016, 9 pages.

Yan et al., "VideoGPT: Video Generation Using VQ-VAE and Transformers", .arXiv:2104.10157v2, Sep. 14, 2021, 14 pages.

Zhang et al., "SOLAR: Deep Structured Representations for Model-Based Reinforcement Learning", International Conference on Machine Learning, 2019, 15 pages.

Zhang et al., "The Unreasonable Effectiveness of Deep Features as a Perceptual Metric", IEEE Conference on Computer Vision and Pattern Recognition (CVPR), 2018, 10 pages.

Zhu et al., "Unpaired Image-to-Image Translation Using Cycle-Consistent Adversarial Networks", arXiv:1703.10593v7, Aug. 24, 2020, 12 pages.

* cited by examiner

PIXEL-LEVEL VIDEO PREDICTION WITH IMPROVED PERFORMANCE AND EFFICIENCY

CROSS-REFERENCE TO RELATED APPLICATIONS

This application is based upon and claims the right of priority under 35 U.S.C. § 371 to International Application No. PCT/US2022/031326 filed on May 27, 2022, which is based on and claims priority to and the benefit of U.S. Provisional Patent Application No. 63/194,457, filed May 28, 2021. Applicant claims priority to and the benefit of each of such applications and incorporates all such applications herein by reference in its entirety.

FIELD

The present disclosure relates generally to machine learning. More particularly, the present disclosure relates to systems and methods for performing pixel-level video prediction with improved performance and efficiency.

BACKGROUND

Predicting what happens next is a cornerstone of intelligence and one of the key capabilities of humans, which humans heavily rely on to make decisions in everyday life. This capability enables a system to anticipate future events and plan ahead to perform temporally extended tasks. While the machine learning literature has studied a wide range of prediction problems, one of the most direct challenges is to predict raw sensory inputs. In particular, prediction of future visual inputs conditioned on a context of past observations—i.e., pixel-level video prediction—encapsulates the challenges of visual perception, modeling of physical events, and reasoning about uncertain behaviors.

Video prediction can be formulated as a self-supervised problem, enabling a system to use a substantial amount of un-labeled data to provide autonomous systems with powerful predictive capabilities as well as learning rich representations for downstream tasks. Already, video models have been successfully deployed in applications such as robotics, simulation, and video synthesis from a single frame.

Despite recent advances in generative models in many domains, such as images and text, video prediction is still considered to be extremely challenging. The current state-of-the-art methods are limited to low-resolution videos (typically 64×64 and a maximum of 256×256) usually in a very narrow domain such as a single human walking, or a robotic arm pushing objects in a stationary setting. Even in such limited domains, the quality of predicted frames tend to drop substantially after less than 10 seconds into the future.

SUMMARY

Aspects and advantages of embodiments of the present disclosure will be set forth in part in the following description, or can be learned from the description, or can be learned through practice of the embodiments.

One example aspect of the present disclosure is directed to a computing system for video prediction with improved efficiency. The computing system can include one or more processors and one or more non-transitory computer-readable media. The media can collectively store a machine-learned video prediction model configured to receive and process one or more previous video frames to generate one or more predicted subsequent video frames. The machine-learned video prediction model can comprise a convolutional variational auto encoder. The convolutional variational auto encoder can comprise an encoder portion comprising one or more encoding cells and a decoder portion comprising one or more decoding cells. The media can collectively store instructions that, when executed by the one or more processors, cause the computing system to process the one or more previous video frames with the machine-learned video prediction model to generate the one or more predicted subsequent video frames.

Another example aspect of the present disclosure is directed to a computing system for datastream prediction with improved efficiency. The computing system can include one or more processors and one or more non-transitory computer-readable media. The media can collectively store a machine-learned datastream prediction model configured to receive and process one or more previous sets of data to generate one or more predicted subsequent sets of data. The machine-learned datastream prediction model can comprise a convolutional variational auto encoder. The convolutional variational auto encoder can comprise an encoder portion comprising one or more encoding cells and a decoder portion comprising one or more decoding cells. The media can collectively store instructions that, when executed by the one or more processors, cause the computing system to process the one or more previous sets of data with the machine-learned datastream prediction model to generate the one or more predicted subsequent sets of data. In some implementations, the datastream comprises a sensor datastream generated by a sensor. In some implementations, the sensor comprises a camera, a light detection and ranging sensor, or a radio detection and ranging sensor.

Another example aspect of the present disclosure is directed to a computer-implemented method for video prediction with improved balance between efficiency and performance. The method includes obtaining one or more previous video frames associated with a video. The method includes accessing a machine-learned video prediction model configured to perform video prediction, wherein the machine-learned video prediction model comprises a model architecture selected to overfit a training dataset comprising one or more training videos. The method includes performing a respective augmentation operation on each of the one or more training videos to generate one or more augmented training videos which form an augmented dataset. The method includes using the one or more augmented training videos of the augmented dataset to train the machine-learned video prediction model to perform video prediction.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
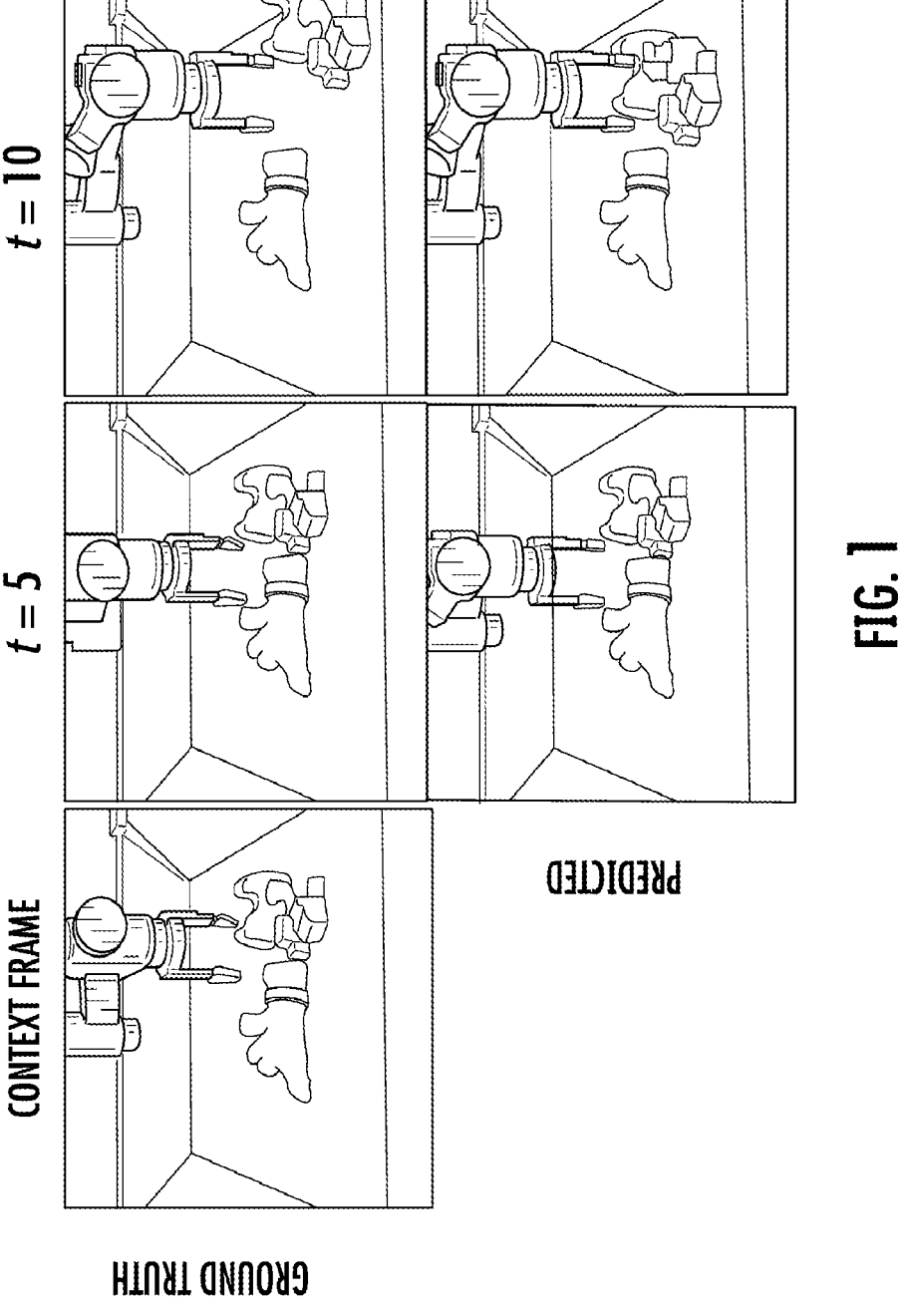
FIG. 1 depicts a graphical diagram of an example video prediction setting according to example embodiments of the present disclosure.

Reference numerals that are repeated across plural figures are intended to identify the same features in various implementations.

DETAILED DESCRIPTION

Overview

Example aspects of the present disclosure provide improved video prediction by leveraging the use of machine learning models which overfit the training dataset. In particular, aspects of the present disclosure recognize that underfitting is one of the primary reasons for low quality predictions from previous video recognition approaches. The present disclosure addresses underfitting by providing an architecture which uses its parameters more efficiently, rather than the naive approach of simply adding additional parameters.

More precisely, example aspects of the present disclosure are directed to a model architecture which can be referred to as "FitVid." FitVid is a model that—with the same parameter count as current state-of-the-art models—can significantly overfit to the video prediction datasets, including benchmarks that prior works have not been able to overfit to. FitVid is the first instance in which a video model reports substantial overfitting on theses benchmarks.

Additional aspects of the present disclosure are directed to techniques which use image augmentation techniques to mitigate the designed-for overfitting, leading to models that can both fit the training set and generalize well to held-out videos. As a result, FitVid achieves state-of-the-art on four challenging video datasets across a wide range of metrics.

Furthermore, FitVid can utilize a significantly simpler training recipe. Prior works on video prediction, particularly those that make use of variational methods to provide for stochasticity, typically require a number of delicate design decisions to train successfully: e.g., curriculum training, a learned prior, and annealing of the weight on the VAE KL-divergence penalty. In contrast to these approaches, the proposed architectures and techniques actually fit the training data well without any such components, training directly via optimizing the evidence lower bound with minimal hyperparameters.

The systems and methods of the present disclosure provide a number of technical effects and benefits. The improvements provided by the proposed model architecture can provide for improved prediction accuracy of the model, reduced consumption of computational resources (e.g., faster computation speed, fewer computational cycles, reduced processor or memory usage, etc.), and/or other improvements over existing models. In particular, a model as proposed herein can achieve comparable performance to a state of the art prediction model while having a fewer number of parameters (e.g., which reduces consumption of computer resources).

Although example aspects of the present disclosure are discussed with particular reference to an example video prediction task, the systems and methods described herein can be applied to any number of different tasks. As one example, the systems and methods described herein can be applied to datastream prediction, where future portions of a datastream can be predicted based on past or observed portions of the datastream. For example, the datastream can be a sensor datastream generated by a sensor. For example, the sensor can be a camera, a LIDAR sensor, a RADAR sensor, or other form of sensor.

With reference now to the Figures, example embodiments of the present disclosure will be discussed in further detail.

Example Discussion of Video Prediction

The problem of pixel-level video prediction can be described as follows: given the first c frames of a video $x_{<c} = x_0, x_1, \ldots, x_{c-1}$, the goal is to predict the future frames by sampling from $p(x_{c:T}|x_{<c})$. Optionally, the predictive model can be conditioned on additional given information at, such as the actions that the agents in the video are planning to take. This is typically called action-conditioned video prediction.

Variational video prediction follows the variational autoencoder formalism by introducing a set of latent variables z to capture the inherent stochasticity of the problem. The latent variables can be fixed for the entire video or vary over time. In both cases, the likelihood model can be factorized to $\Pi_{t=c}^{T} p_\theta(x_t|x_{<t}, z_{\leq t})$ which is parametrized in an autoregressive manner over time; i.e. at each timestep t the video frame $x_t$ and the latent variables $z_t$ are conditioned on the past latent samples and frames. By multiplying the prior the predictive model can be factorized as $$p(x_{c:T}|x_{<c}) = \Pi_{t=c}^{T} p_\theta(x_t|x_{<t}, z_{\leq t}) p(z_t|x_{<t}, z_{<t})$$

where the prior $p(z) = p(z_t|x_{<t}, z_{<t})$ can be either fixed or learned. For inference, a marginalized distribution can be computed over the latent variables z, which is intractable. To overcome this problem, variation inference can be used by defining an amortized approximate posterior $q(z|x) = \Pi_t q(z_t|z_{<t}, x_{\leq t})$ that approximates the posterior distribution $p(z|x)$. The approximated posterior is commonly modeled with an inference network $q_\phi(z|x)$ that outputs the parameters of a conditionally Gaussian distribution $\mathcal{N}(\mu_\phi(x), \sigma_\phi(x))$. This network can be trained using the reparameterization trick, according to:

$$z = \mu_\phi(x) + \sigma_\phi(x) \times \varepsilon, \varepsilon \sim \mathcal{N}(0, I)$$

Here, $\theta$ and $\phi$ are the parameters of the generative model and inference network, respectively. To learn these parameters, example implementations of the present disclosure can optimize the variational lower bound:

$$\mathcal{L}(x) = -\mathbb{E}_{q_\phi(z|x)}[\log p_\theta(x_{c:T}|x_{<t}, z)] + \beta D_{KL}(q_\phi(z|x) \| p(z)) \tag{1}$$

where $D_{KL}$ is the Kullback-Leibler divergence between the approximated posterior and the prior p(z) which is fixed to $p(z) = \mathcal{N}(0, I)$. The hyper-parameter $\beta$ represents the trade-off between minimizing frame prediction error and fitting the prior.

Example Video Prediction Model Architectures

Example aspects of the present disclosure provide the FitVid model for stochastic video prediction, a convolutional non-hierarchical variational model with a fixed prior of N(0,I). One example architecture of FitVid is shown in FIG. 2.

Figure 2:
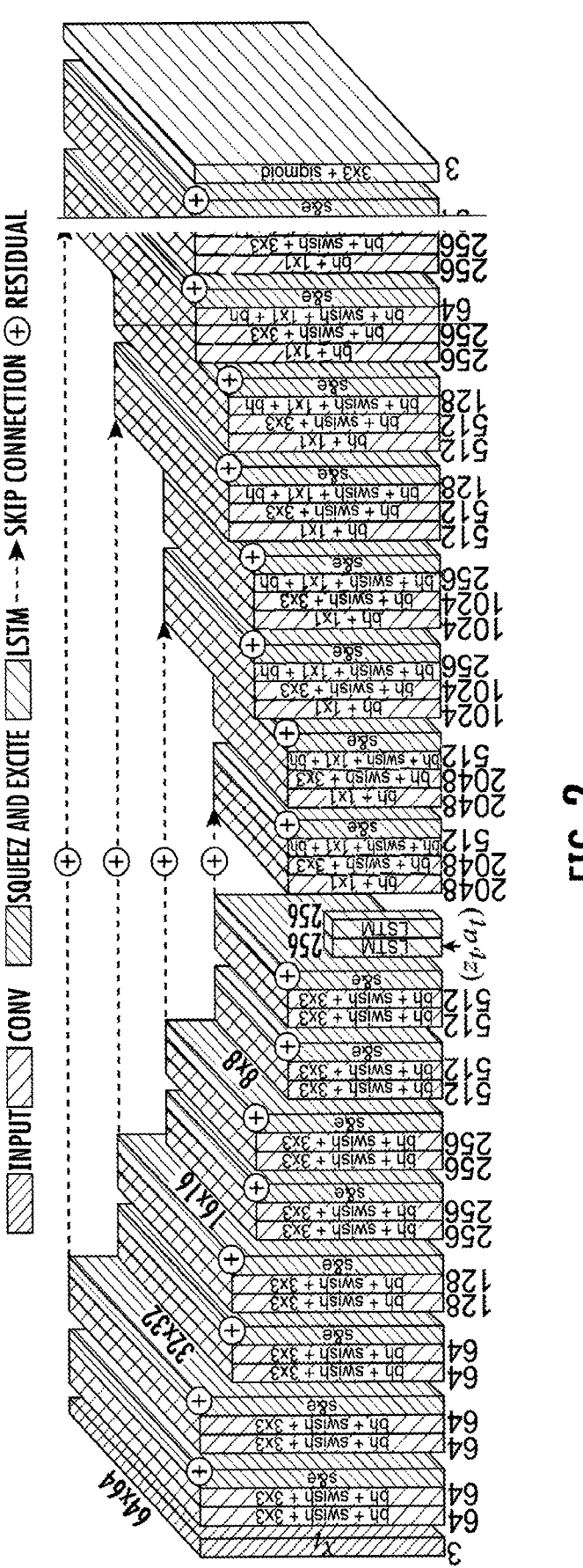
FIG. 2 depicts a block diagram of an example machine-learned model according to example embodiments of the present disclosure.

Specifically, in FIG. 2 (bn) is batch-normalization, (swish) is the activation, (s&e) is Squeeze and Excite, and (NxN) is a convolutional layer with kernel size of NxN. In the example architecture illustrated in FIG. 2, the strides are always one, except when down-sampling which has a stride of two. For up-sampling, nearest neighbor can be used. The number under each box shows the number of filters while the top numbers indicate the input size. To model the dynamics, two layers of LSTMs can be used. FIG. 2 provides one example architecture. Other architectures can be used to implement aspects of the present disclosure. Some of these example aspects are described in further detail below.

Encoder and Decoder.

Some example implementations of the present disclosure use a number of residual encoding and decoding cells. Each cell can include convolutional layers with batch-normalization and swish as the activation function, followed by Squeeze and Excite. Batch normalization is described at Sergey Ioffe and Christian Szegedy. Batch normalization: Accelerating deep network training by reducing internal covariate shift. In *International conference on machine learning*, pages 448-456. PMLR, 2015. The swish function is described at Prajit Ramachandran, Barret Zoph, and Quoc V Le. Searching for activation functions, arXiv preprint arXiv:1710.05941, 2017, among others. Squeeze and Excite is described at Jie Hu, Li Shen, and Gang Sun. Squeeze-and-excitation networks. In Proceedings of the IEEE conference on computer vision and pattern recognition, pages 7132-7141, 2018.

In some implementations, an encoder portion of the video prediction model can include four encoding blocks with two cells in each block. In some implementations, there is down-sampling after each encoder block using a strided convolution of size three in the spatial dimensions.

In some implementations, the decoder portion can also include four decoding blocks with two cells in each block, and a nearest neighbour up-sampling after each block. In some implementations, the number of filters in each encoding block can be doubled while the number of filters in each decoding block can be halved from the previous one. In some implementations, there is a residual skip connection between the encoder and the decoder after each cell which are fixed to the output from the last context frame. In some implementations, the statistics for batch-normalization is averaged across time.

Dynamics Model.

In some implementations, an encoded frame $h_t$ is used to predict $h_{t+1}$ using two layers of LSTMs. Likewise, $q(z_t|x_{<t})$ can also be modeled using a single layer of LSTMs with $h_{t+1}$ as the input that outputs the parameters of a conditionally Gaussian distribution $\mathcal{N}(\mu_\phi(x), \sigma_\phi(x))$. During the training, z can be sampled from $q(z_t|x_{<t})$ while at the inference time z can be sampled from the fixed prior $\mathcal{N}(0, I)$. In some implementations, at training, the input to the model is always the ground-truth image (which is usually referred to as teacher-forcing). At inference time, the predicted image in the previous time-step can be used as input to predict the next frame.

Data Augmentation.

According to an aspects of the present disclosure, FitVid can substantially overfit on some of the video prediction datasets. To prevent the model from overfitting, augmentation can be performed. In contrast, prior work in video prediction does not use augmentation, perhaps because prior state-of-the-art models tend to underfit already and therefore would not benefit from it. As one example, the videos using RandAugment, which is described at Ekin D Cubuk, Barret Zoph, Jonathon Shlens, and Quoc V Le. Randaugment: Practical automated data augmentation with a reduced search space. In Proceedings of the IEEE/CVF Conference on Computer Vision and Pattern Recognition Workshops, pages 702-703, 2020.

Figure 3:
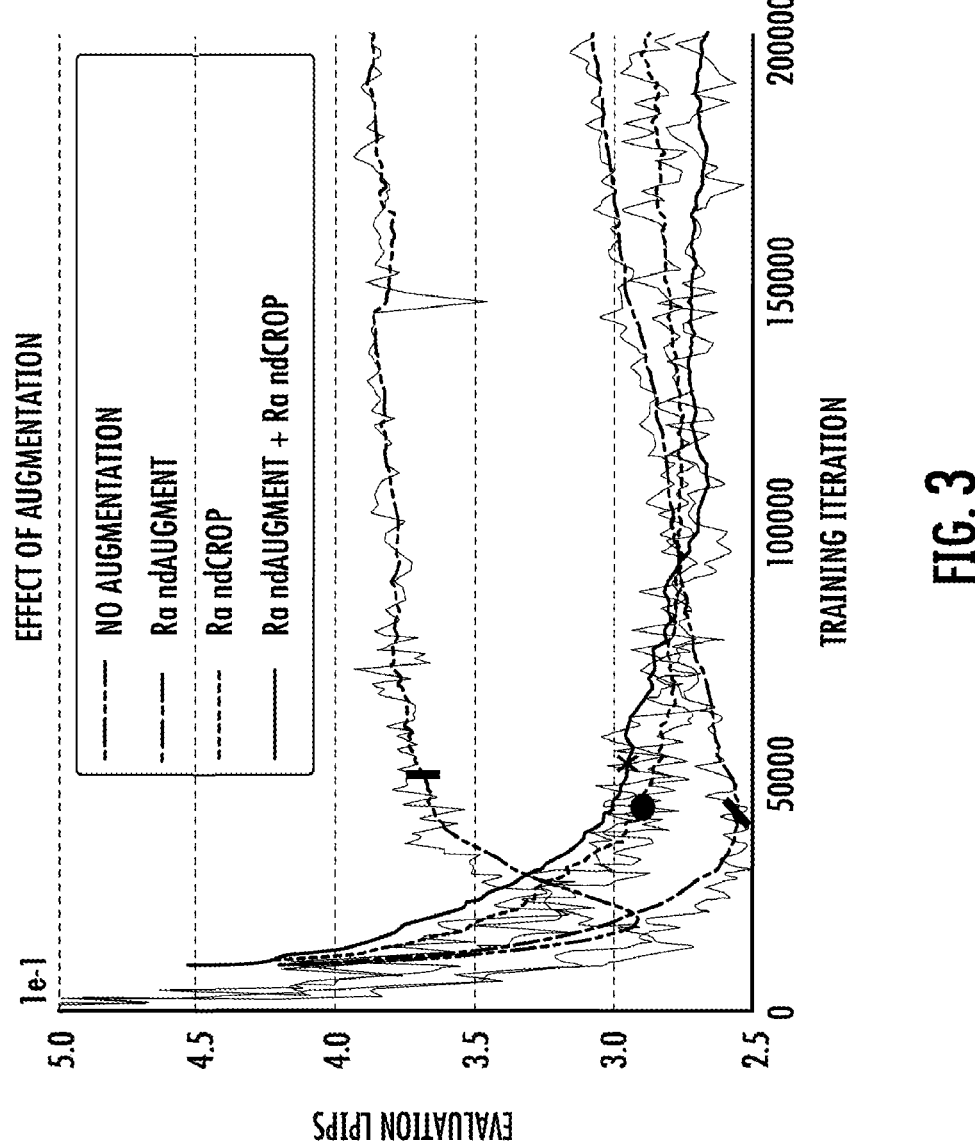
FIGS. 3-7 depict example experimental results according to example embodiments of the present disclosure.

Some example implementations of the present disclosure can randomize the augmentation per video but keep the randomization constant for frames of a single video. RandAugment substantially improves the overfitting, however not entirely, as can be seen in FIG. 3. In some implementations, the augmentation can be improved by selecting a random crop of the video before resizing it to the desired resolution at the training time, called RandCrop. The combination of RandCrop and RandAugment successfully prevents the overfitting, leading to models that both fit the training set and generalize well to held-out videos.

What FitVid does not Need.

Prior works on variational video prediction generally require a range of additional design decisions for effective training. Common design parameters include using curriculum training, commonly by scheduled sampling, to mitigate distributional shift between training and generation time; heuristically tuning β in Eqn 1 to balance the prediction vs fitting the prior by annealing it over the course of training or learned priors. Each of these design choices introduces hyperparameters, tuning burden, and additional work when applying a model to a new task. FitVid does not require any of these details: for example it can be trained by simply optimizing $\mathcal{L}(x)$ from Eqn 1 using an optimization algorithm (e.g., Adam).

Example Experiments

To evaluate FitVid, tests were performed on four different real-world datasets the performance of FitVid was compared with prior state-of-the-art methods, with comparable parameter count, using four different metrics. One main goal is to demonstrate that FitVid can in fact overfit on these datasets and illustrate how augmentation can prevent FitVid from overfitting, resulting in state-of-the-art prediction performance.

Experimentation Setup

Datasets: To test FitVid, four datasets were used that cover a variety of real-life scenarios. As one example, the Human3.6M dataset was used, which consists of actors performing various actions in a room to study the structured motion prediction. Human3.6M is described at Catalin Ionescu, Dragos Papava, Vlad Olaru, and Cristian Sminchisescu. Human3. 6m: Large scale datasets and predictive methods for 3d human sensing in natural environments. IEEE transactions on pattern analysis and machine intelligence, 36(7), 2014. As another example, the KITTI dataset was used to evaluate FitVid's ability to handle partial observability and dynamic backgrounds. The KITTI dataset is described at Andreas Geiger, Philip Lenz, Christoph Stiller, and Raquel Urtasun. Vision meets robotics: The kitti dataset. The International Journal of Robotics Research, 32(11):1231-1237, 2013. For both datasets, the experiments including running models to predict 25-frames conditioned the previous five in a 64×64 resolution.

To evaluate FitVid in an action-conditioned setting, another experiment used the RoboNet dataset, which is described at Sudeep Dasari, Frederik Ebert, Stephen Tian, Suraj Nair, Bernadette Bucher, Karl Schmeckpeper, Siddharth Singh, Sergey Levine, and Chelsea Finn. Robonet: Large-scale multi-robot learning. In CoRL, 2019. This large dataset includes more than 15 million video frames from 7 different robotic arms pushing objects in different bins. It contains a wide range of conditions, including different viewpoints, objects, tables, and lighting. Prior video prediction methods have a tendency to badly underfit on this dataset. Unfortunately, RoboNet does not provide a standard train/test partition. Hence, 256 videos were randomly selected for testing. FitVid is trained to predict next ten frames given two context frames as well as the ten future actions.

Finally, to compare FitVid to a wider range of prior work, the BAIR robot pushing dataset was used, which is a widely-used benchmark in the video prediction literature. The BAIR dataset is described at Frederik Ebert, Chelsea Finn, Alex X Lee, and Sergey Levine. Self-supervised visual planning with temporal skip connections, In Conference on Robot Learning (CoRL), 2017. The evaluation protocol includes predicting the next 16 frames given only one context frame and no actions. Given the high stochasticity of robotic arm movement in BAIR, particularly in the action-free setting, it is a great benchmark for evaluating the model's ability to generate diverse outputs.

Metrics: The proposed method and prior models were evaluated across four different metrics: Structural Similarity Index Measure (SSIM), Peak Signal-to-noise Ratio (PSNR), Learned Perceptual Image Patch Similarity (LPIPS), and Frechet Video Distance (FVD). FVD measures the overall visual quality and temporal coherence without reference to the ground truth video. PSNR, SSIM, and LPIPS measure pixel-wise similarity to the ground-truth with LPIPS most accurately representing human perceptual similarity. Given the stochastic nature of video prediction benchmarks, the following stochastic video prediction evaluation protocol was used: 100 future trajectories were sampled per video and the best one was selected as the final score for PSNR, SSIM and LPIPS. For FVD, all 100 were used with a batch size of 256.

Example Results

Comparisons: First, FitVid was compared to GHVAE and SVG. GHVAE is described at Bohan Wu, Suraj Nair, Roberto Martin-Martin, Li Fei-Fei, and Chelsea Finn. Greedy hierarchical variational autoencoders for large-scale video prediction. arXiv preprint arXiv:2103.04174, 2021. SVG is described at Ruben Villegas, Arkanath Pathak, Harini Kannan, Dumitru Erhan, Quoc V Le, and Honglak Lee. High fidelity video prediction with large stochastic recurrent neural networks. In Advances in Neural Information Processing Systems, pages 81-91, 2019. These two baseline were chosen because they both investigated overfitting by scaling the model, and achieve state-of-the-art results. However, SVG reported no overfitting even for their biggest model with 298M parameters while GHVAE (with 599M paramteres) reported "some overfitting" on smaller datasets. At the same time, both of these models share a similar architecture to FitVid. GHVAE is a hierarchical variational video prediction model trained in a greedy manner. SVG is a large-scale variational video prediction model with learned prior and minimal inductive bias. As mentioned before, the comparison is against the largest version of SVG (M=3, K=5) which has 298 million parameters that is in the same ballpark as FitVid with 302 million parameters.

Table 1 contains the results of these experiments. As it can be seen in this table, FitVid outperforms both SVG and GHVAE across all metrics in Robonet and Human3.6M. In KITTI, FitVid also consistently outperforms SVG while either improves or closely matches the performance of GHVAE which has more than twice as many parameters. For qualitative results, see FIGS. 4, 5, and 6.

In particular, Table 1 provides an empirical comparison between FitVid (with 302M parameters), GHVAE (with 599M parameters) and SVG (with 298M parameters). To prevent FitVid from overfitting, augmentation was used for Human3.6M and KITTI.

| RoboNet | FVD↓ | PSNR↑ | SSIM↑ | LPIPS↓ |
|---|---|---|---|---|
| GHVAE | 95.2 | 24.7 | 89.1 | 0.036 |
| SVG | 123.2 | 23.9 | 87.8 | 0.060 |
| FitVid (ours) | 62.5 | 28.2 | 89.3 | 0.024 |
| KITTI | FVD↓ | PSNR↑ | SSIM↑ | LPIPS↓ |
| GHVAE | 552.9 | 15.8 | 51.2 | 0.286 |
| SVG | 1217.3 | 15.0 | 41.9 | 0.327 |
| FitVid (ours) | 884.5 | 17.1 | 49.1 | 0.217 |
| Human3.6M | FVD↓ | PSNR↑ | SSIM↑ | LPIPS↓ |
| Skip Frame of 1 | | | | |
| GHVAE | 355.2 | 26.7 | 94.6 | 0.018 |
| SVG | — | — | — | 0.060 |
| FitVid (ours) | 154.7 | 36.2 | 97.9 | 0.012 |
| Skip Frame of 8 | | | | |
| SVG | 429.9 | 23.8 | 88.9 | — |
| FitVid (ours) | 385.9 | 27.1 | 95.1 | 0.026 |

Figure 4:
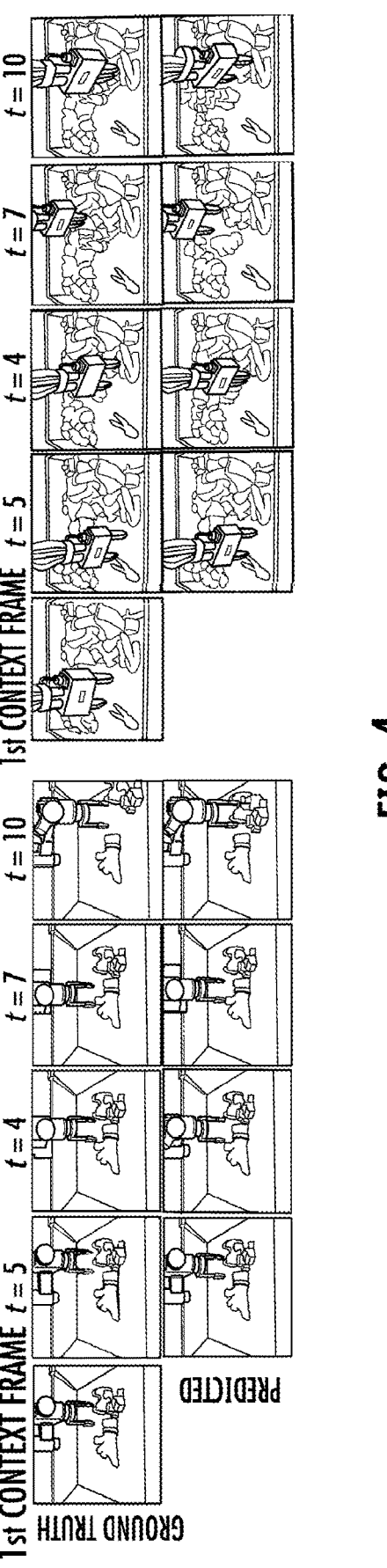

FIG. 4 shows the results of FitVid on action-conditioned RoboNet. The model is conditioned on the first two frames and is predicting the next ten frames given the future actions of the robotic arm. These figures demonstrate how the predicted movements of the arm closely follows the ground truth given that the future actions is known. The model also predicts detailed movements of the pushed objects (visible in the left example) as well as filling in the previously unseen background with some random objects (look at the object that appear behind the robotic arm in the right). Also notice the wrong predictions of robot's fingers in the right example.

Figure 5:
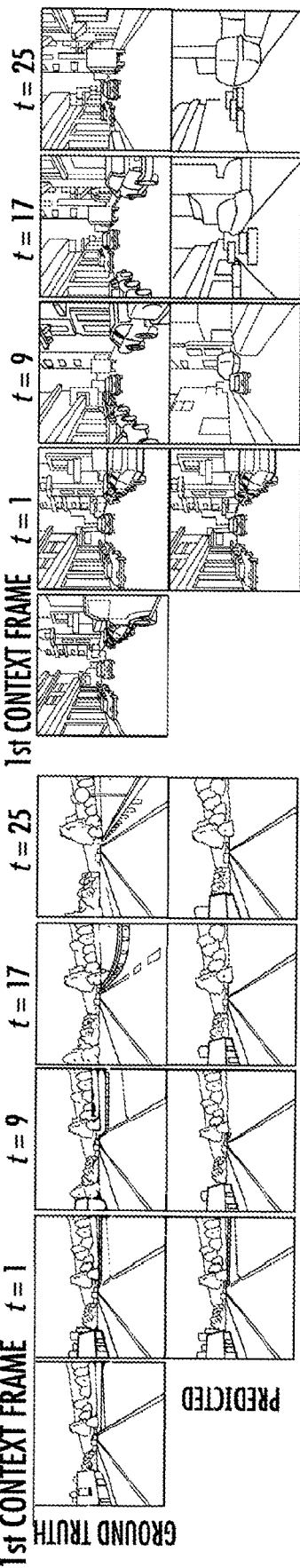

FIG. 5 shows the results of FitVid on the KITTI dataset. As it can be seen in this figure, the model generates high quality prediction of the future in a dynamic scene. Note how in the top example FitVid keeps predicting the movement of the shadow on the ground till it gets out of the frame. After that, the model still brings the background closer in each frame, implying driving forward.

Figure 6:
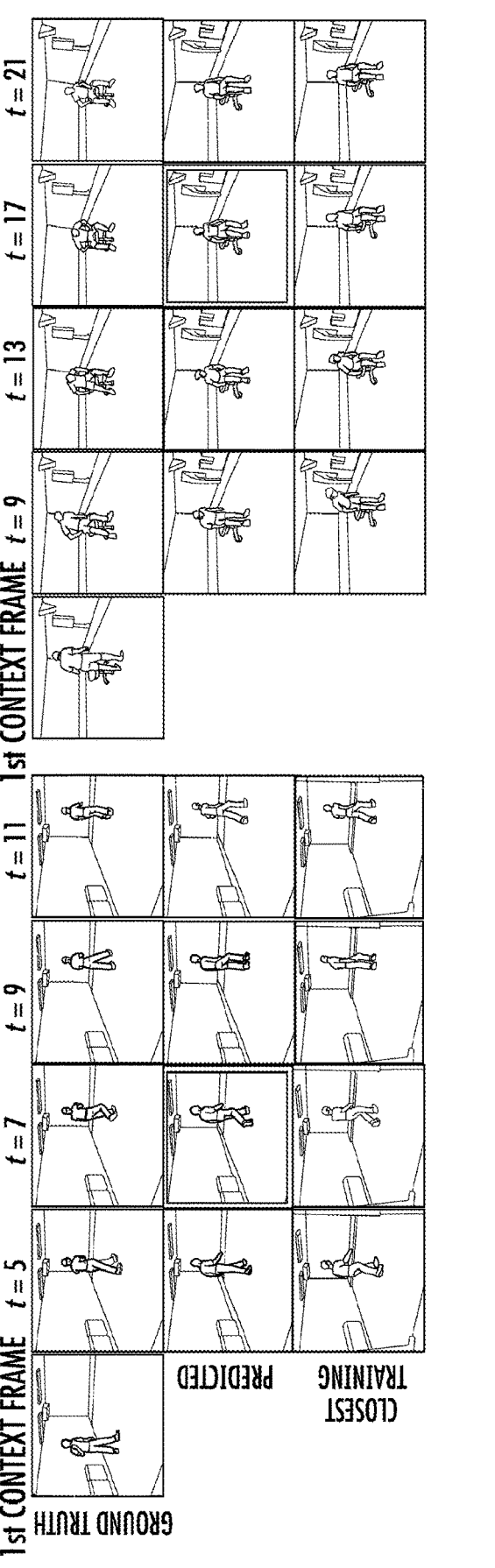

FIG. 6 shows the results of FitVid on Human3.6M. This figure demonstrates extremely detailed and human-like motions predicted by FitVid, conditioned on the given context frames. However, on closer inspection, it can be seen that the human subject in the video is changing, from the test subject to a training subject. This is particularly evident from the cloths. This phenomena indicates that, although FitVid is capable of generalizing to the frames out of training distribution, however, it morphs the human subject into a familiar one from the training set and then plays the video from the memory. In fact, we can find similar videos in the training set as visualized in the last row. The highlighted frame is the one used for finding the closest training video.

Comparison to non-variational methods: To compare the performance of FitVid with more prior methods, including non-variational models, it was also tested on the BAIR robot pushing dataset. As can be seen in Table 2, FitVid outperforms most of the previous models in this setting while performing comparably to Video Transformer which contains 373M parameters. Video Transformer is described at Dirk Weissenborn, Oscar Tackstrom, and Jakob Uszkoreit. Scaling autoregressive video models. arXiv preprint arXiv: 1906.02634, 2019.

TABLE 2

| BAIR | FVD↓ |
|---|---|
| SV2P | 262.5 |
| Latent Video Transformer | 125.8 |
| SAVP | 116.4 |
| DVD-GAN-FP | 109.8 |
| VideoGPT | 103.3 |
| TrIVD-GAN-FP | 103.3 |
| Video Transformer | 94.0 |
| FitVid (ours) | 93.6 |

Example Analysis of Experimental Results

This section analyses the results from the previous section, to analyze the consequences of overfitting and the effect of regularization on the current benchmarks.

On Human3.6M as a video prediction benchmark: Human3.6M is a common benchmark in video prediction literature which was also used to evaluate FitVid. At the first glance, it seems that the model is generating extremely detailed and human-like motions conditioned on the given context pose. However, on closer inspection, it is observed that the human subject in the predicted video is changing. In fact, FitVid replaces the unseen human subject into a training subject which is particularly evident from the clothing. Actually, we can find similar video clips from the training data for each one of the predicted videos. These frames are not exactly the same, but they look notably similar. This observation indicates that:

1. The model can generalize to unseen frames and subjects since the test context frames are new and unseen. FitVid detects the human and continues the video from there.
2. The model memorized the motion and the appearance of the training subjects. The model morphs the test human subject into a training one, and then plays a relevant video from the memory.

This means that FitVid fails to generalize to a new subject, while still generalizing to unseen frames. Given that the Human3.6M has five training and two test subjects this may not be surprising.

Nevertheless, this observation shows how the current low-resolution setup for Human3.6M is not suitable for large-scale video prediction. In fact, after this observation, the same behavior was traced in other video prediction literature and, unfortunately, it seems this is a common and overlooked issue.

Figure 7:
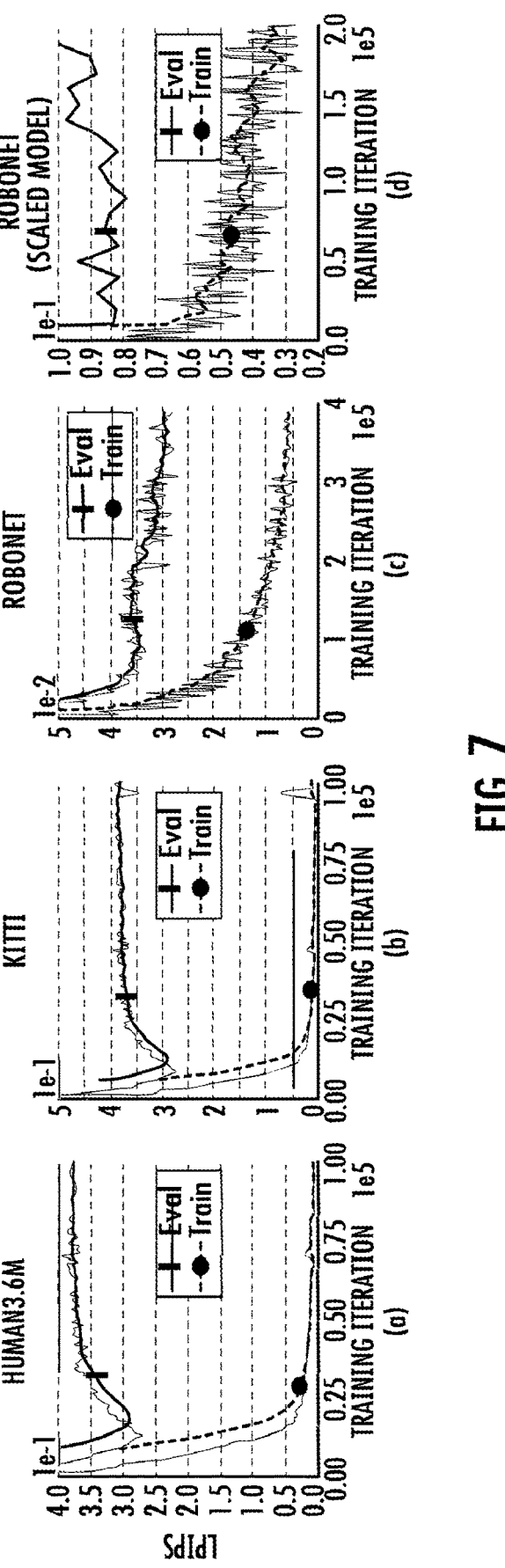

Overfitting and regularization: As mentioned in elsewhere herein, there is considerable evidence that current video prediction models tend to underfit when trained on large datasets. GHVAE, which is the current state-of-the-art model with 599 million parameters, reported "some overfitting" on smaller datasets such as Human3.6M and KITTI. However, the experiments demonstrated observe severe and clear overfitting with FitVid, despite having only 302 million parameters. FIG. 7 visualizes the training and evaluation LPIPS metric while training FitVid on Human3.6M, without augmentation. This graph demonstrates that the training keeps getting better while the test quality starts to get worse after ~15K iterations. Similar behavior was also observed on KITTI. These results clearly shows that FitVid is overfitting on Human3.6M and KITTI, indicating that FitVid is using its parameters more efficiently. As mentioned in elsewhere herein, to address overfitting, augmentation can be used. As a result FitVid achieves state-of-the-art results as reported in Table 1.

Overfitting on Robonet: Overfitting was not observed on RoboNet, which is expected given the fact that RoboNet is much larger compared to the other benchmarks. Trying to find a model that can overfit on RoboNet, a scaled version of FitVid with 500M parameters was tested—which is still smaller compared to GHVAE with 599M parameters and reported no overfitting on this dataset. This scaled version of FitVid overfits on RoboNet, as demonstrated in FIG. 7. Note that the experiments did not use this scaled version in the reported numbers of Table 1, which is generated using the 302M version. The goal here was to demonstrate that a scaled version of FitVid can also use its parameters more efficiently, compared to prior models, leading to overfitting on even bigger datasets such as RoboNet.

FIG. 7 shows the effect of overfitting of FitVid without augmentation. This figure visualizes the training and evaluation metrics on (a) Human3.6M, (b) KITTI and (c) Robonet, without augmentation. As it can be seen, in all cases, FitVid overfits on the training data except for Robonet. This is evident from the evaluation measurement going up while the training keeps decreasing. In case of Robonet, FitVid with 302M parameters did not overfit but a scaled version of the model with 600M parameters did, as can be seen in (d). y-axis is LPIPS. x-axis is the training iteration. The plots are smoothed with an average rolling window of size ten. The shadows are the raw non-smoothed values.

Effect of Augmentation on SVG: There is a discrepancy between the input data for training the models in some of the example experiments. FitVid is trained with augmentation while the baselines are trained without any augmentation which raises a question: can the better performance of FitVid be explained only by the augmentation? In other words, do the previous methods benefit from augmentation too? To answer this question, SVG was retrained with and without augmentation. As demonstrated in Table 3, SVG performs worse if trained with augmented data, supporting the claim that it is underfitting to the raw data. As a result, this experiment provides more support for FitVid truly overfitting on these datasets and therefore benefiting from augmentation.

Table 3 shows SVG with and without augmentation. This table shows that SVG does not benefit from augmentation as it is underfitting to the original data.

| Human3.6M | FVD↓ | PSNR↑ | SSIM↑ | LPIPS↓ |
|---|---|---|---|---|
| Without | 389.55 | 27.4 | 93.7 | 0.041 |
| With | 429.25 | 23.0 | 87.1 | 0.094 |

| KITTI | FVD↓ | PSNR↑ | SSIM↑ | LPIPS↓ |
|---|---|---|---|---|
| Without | 1612.62 | 14.8 | 38.7 | 0.330 |
| With | 2051.67 | 14.4 | 36.0 | 0.333 |

Zero-shot Real Robot Performance: Prior work indicates that improved video prediction translates to better performance in the downstream tasks. However, in these works, the training and test distribution are the same and there is almost no domain shift from training to testing. This section investigates whether FitVid is capable of generalizing to a similar but visually different task with no training data for this new domain. Therefore, an example real-robot experiment was conducted with a Franka Emika Panda robot arm, in which the goal is to push a specific object to a predetermined goal position. FitVid was trained on RoboNet and used cross-entropy method (CEM) for planning. As can be seen in Table 4, this agent is unable to generalize to the new domain, achieving worse performance than a random agent. This may not be surprising given the fact that the videos in RoboNet have entirely different robots and visuals, although the robots are performing the same task (i.e. pushing objects in a bin using a robotic arm).

Next, the experiment tried bring the training and test domain closer to each other by fine-tuning FitVid on the data from GHVAE. This data contains 5000 autonomously collected videos of a Franka Emika Panda robot arm pushing objects around which look more similar to our setup compared to RoboNet, but still contain different lighting, camera angle, and target objects. This time, we observe that FitVid is relatively successful at generalizing to the new domain, succeeding in 56% of the trials. Finally, we find that adding data augmentation to the fine-tuning improves the generalization ability of the model, achieving 78% success rate. These results illustrate that while large distribution shift adaptation (RoboNet) remains difficult, by using data augmentation FitVid is capable of adapting to a relatively new domain.

Table 4 shows zero-shot real robot performance. FitVid was used for planning future actions of a real robot pushing an object to a goal location with no training data from our setup. The model was trained on visually different data (RoboNet) and the data from a closer domain (from GHVAE) with and without augmentation. While unable to directly adapt from RoboNet to the new domain, the results illustrate that fine-tuning on similar data and augmentation improve FitVid's performance.

| Training Data | Success Rate |
|---|---|
| Baseline (random actions) | 28% |
| RoboNet | 17% |
| RoboNet + GHVAE Data | 56% |
| RoboNet + Augmented GHVAE Data | 78% |

Thus, the present disclosure proposes FitVid, a simple and scalable variational video prediction model that can attain a significantly better fit to current video prediction datasets even with a similar parameter count as prior models. In fact, while prior methods generally suffer from underfitting on these datasets, naïvely applying FitVid actually results in overfitting. The present disclosure therefore proposes a set of data augmentation techniques for video prediction that prevent overfitting, leading to state-of-the-art results across a range of prediction benchmarks.

This is the first time a model reports substantial overfitting on these benchmarks. This is particularly important because underfitting is usually cited as one the main reasons for low quality predictions of the future frames. The present disclosure demonstrates how image augmentation techniques can prevent the model from overfitting, resulting in high quality images. As a result, FitVid outperformed the current state-of-the-art models across four different video prediction benchmarks on four different metrics. The present disclosure also illustrates how a model that can properly fit the training data, can fool the current benchmarks and metrics resulting in undesired outcomes, which are often overlooked in the video prediction literature.

There are many ways that FitVid can be expanded. As mentioned in the text, one of the interesting features of our proposed method is that it is simple. It is non-hierarchical, convolutional, with no attention mechanism, no curriculum learning, and no training scheduling. Any of these features can potentially improve the results of FitVid in order to generate even higher quality images. Given the simplicity of FitVid, it can be easily built upon. Another interesting direction is to introduce new training-aware metrics for video prediction and generation to signal when a model is generating high quality videos by repeating the training data.

Example Devices and Systems

Figure 8A:
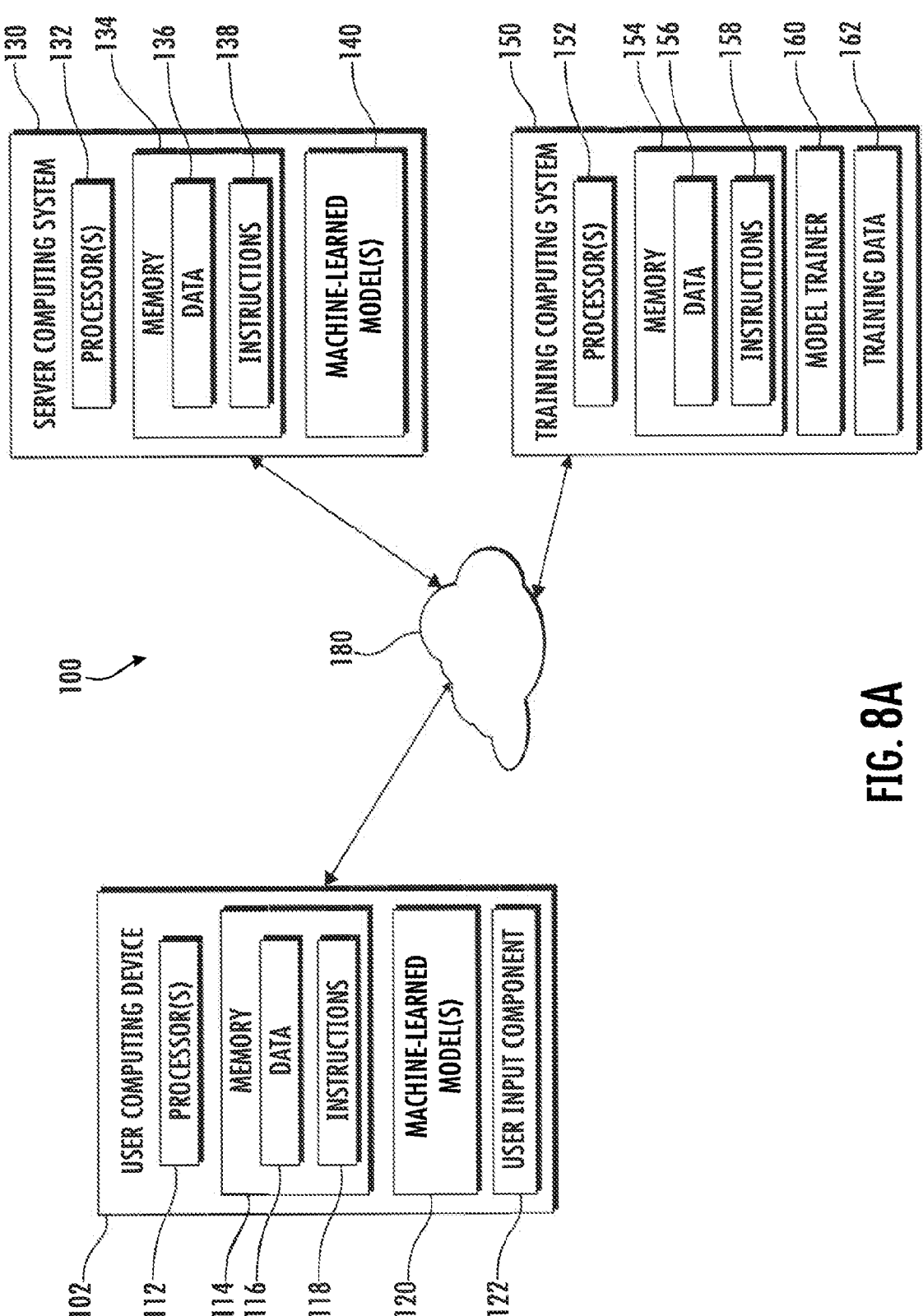
FIG. 8A depicts a block diagram of an example computing system according to example embodiments of the present disclosure.

FIG. 8A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel prediction across multiple inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a prediction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data which has been augmented according to one or more augmentation operations. Augmentation operations can include modify the training data in some way include adding noise, changing spatial dimensions, and/or various other augmentations.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 8A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 8B:
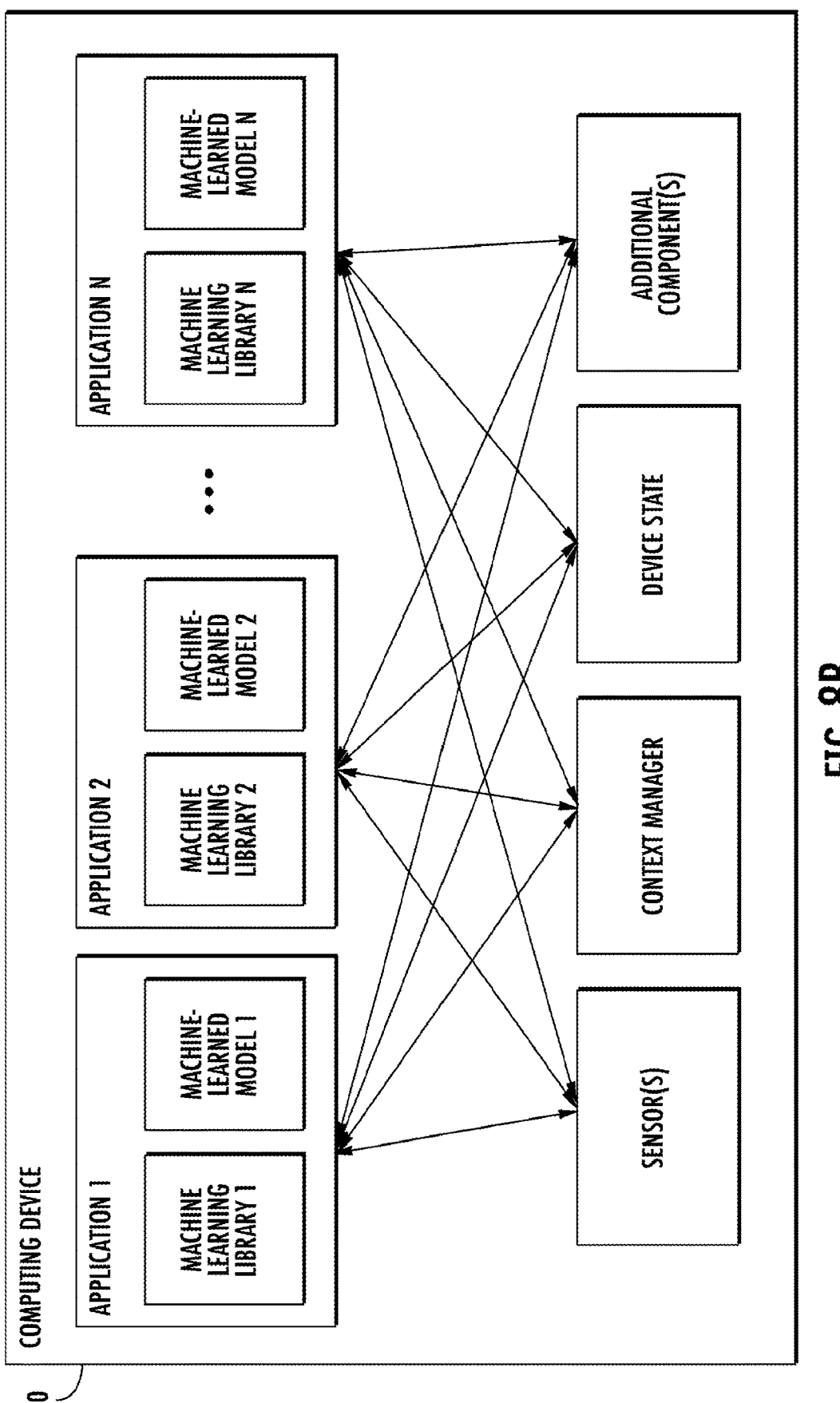
FIG. 8B depicts a block diagram of an example computing device according to example embodiments of the present disclosure.

FIG. 8B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 8B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 8C:
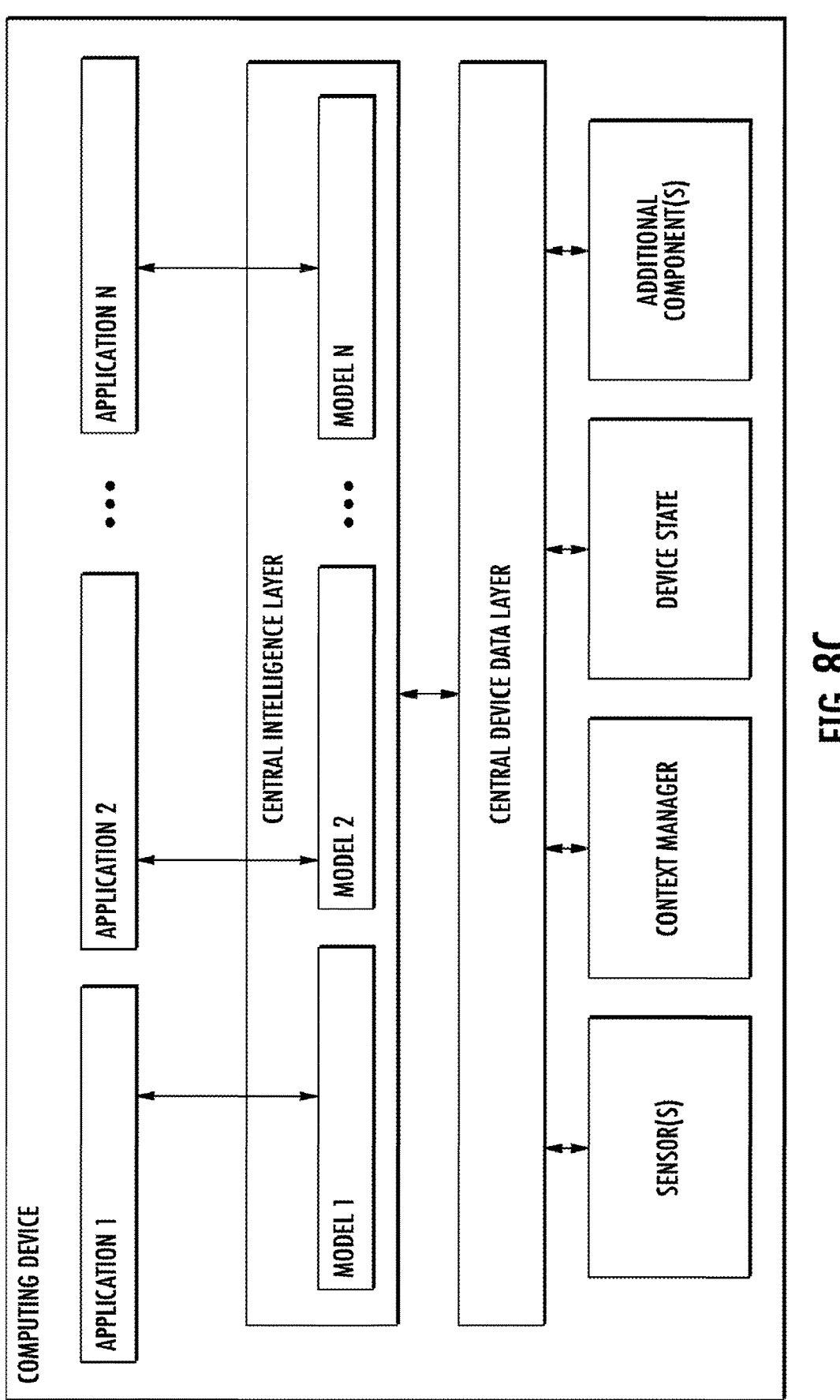
FIG. 8C depicts a block diagram of an example computing device according to example embodiments of the present disclosure.

FIG. 8C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 8C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for video prediction with improved efficiency, the computing system comprising:

one or more processors; and one or more non-transitory computer-readable media that collectively store:

a machine-learned video prediction model configured to receive and process one or more previous video frames to generate one or more predicted subsequent video frames, wherein the machine-learned video prediction model comprises a convolutional variational auto encoder, and wherein the convolutional variational auto encoder comprises:

an encoder portion comprising one or more encoding cells configured to process the one or more previous video frames to generate an encoded representation of the one or more previous video frames, a dynamic portion comprising a machine-learned model configured to process the encoded representation of the one or more previous video frames to predict, based on the encoded representation of the one or more previous video frames, an encoded representation of the one or more predicted subsequent video frames, and a decoder portion comprising one or more decoding cells configured to process the encoded representation of the one or more predicted subsequent video frames to generate, based on the encoded representation of the one or more predicted subsequent video frames, the one or more predicted subsequent video frames, wherein the machine-learned video prediction model has been trained on training videos, and wherein the training videos were augmented prior to their use to train the machine-learned video prediction model; and instructions that, when executed by the one or more processors, cause the computing system to process the one or more previous video frames with the machine-learned video prediction model to generate the one or more predicted subsequent video frames.

2. The computing system of claim 1, wherein at least one of the one or more encoding cells or the one or more decoding cells comprises one or more convolutional layers followed by a Squeeze and Excite layer, and wherein each convolutional layer is configured to perform batch normalization and apply a swish activation function.

3. The computing system of claim 1, wherein the encoder portion comprises four encoding blocks with two encoding cells in each encoding block, wherein each encoding cell comprises two or more convolutional layers followed by a Squeeze and Excite layer.

4. The computing system of claim 3, wherein the encoder portion performs downsampling after each of the encoding blocks.

5. The computing system of claim 3, wherein a respective number of filters in each encoding block is double relative to a preceding encoding block.

6. The computing system of claim 1, wherein the decoder portion comprises four encoding blocks with two decoding cells in each decoding block, wherein each decoding cell comprises three convolutional layers followed by a Squeeze and Excite layer.

7. The computing system of claim 5, wherein the decoder portion performs nearest neighbor upsampling after each of the decoding blocks.

8. The computing system of claim 5, wherein a respective number of filters in each decoding block is one half relative to a preceding encoding block.

9. The computing system of claim 1, wherein the convolutional variational auto encoder further comprises one or more long short term memory (LSTM) layers positioned between the encoder portion and the decoder portion, wherein a first LSTM layer of the one or more LSTM layers receives as input a set of latent variables, wherein the set of latent variables are predicted during training of the convolutional variational auto encoder but sampled from a fixed prior during interference by the convolutional variational auto encoder.

10. The computing system of claim 1, wherein the convolutional variational auto encoder is configured to receive an action conditioning input that conditions the convolutional variational auto encoder to generate the one or more predicted subsequent video frames depicting a given action represented by the action conditioning input.

11. The computing system of claim 1, wherein the convolutional variational auto encoder is non-hierarchical.

12. The computing system of claim 1, wherein the training videos were augmented according to one or more augmentation operations, wherein the one or more augmentation operations comprise an augmentation operation selected from: adding noise to training video data, or changing a spatial dimension of training video data.

13. The computing system of claim 1, wherein the training videos were augmented according to one or more augmentation operations, wherein the one or more augmentation operations comprise an augmentation operation randomly applied for a respective training video, wherein the randomization is constant for frames of the respective training video.

14. The computing system of claim 1, wherein the training videos were augmented according to one or more augmentation operations, wherein the one or more augmentation operations comprise, prior to inputting the one or more previous video frames to the machine-learned video prediction model to generate one or more predicted subsequent video frames during the training of the machine-learned video prediction model:

selecting a random crop of the one or more previous video frames; and resizing the crop to a target resolution for training.

15. A computing system for datastream prediction with improved efficiency, the computing system comprising:

one or more processors; and one or more non-transitory computer-readable media that collectively store:

a machine-learned datastream prediction model configured to receive and process one or more previous sets of data from a datastream to generate one or more predicted subsequent sets of data for the datastream, wherein the machine-learned datastream prediction model comprises a convolutional variational auto encoder, wherein the convolutional variational auto encoder comprises:

an encoder portion comprising one or more encoding cells configured to process the one or more previous sets of data to generate an encoded representation of the one or more previous sets of data, a dynamic portion comprising a machine-learned model configured to process the encoded representation of the one or more previous sets of data to predict, based on the encoded representation of the one or more previous sets of data, an encoded representation of the one or more predicted subsequent sets of data, and a decoder portion comprising one or more decoding cells configured to process the encoded representation of the one or more predicted subsequent sets of data to generate, based on the encoded representation of the one or more predicted subsequent sets of data, the one or more predicted subsequent sets of data;

the machine-learned datastream prediction model trained on training data modified according to one or more augmentation operations; and instructions that, when executed by the one or more processors, cause the computing system to process the one or more previous sets of data with the machine-learned datastream prediction model to generate the one or more predicted subsequent sets of data.

16. The computing system of claim 15, wherein the datastream comprises a sensor datastream generated by a sensor.

17. The computing system of claim 16, wherein the sensor comprises a camera, a light detection and ranging sensor, or a radio detection and ranging sensor.

18. One or more non-transitory computer-readable media that collectively store:

a machine-learned video prediction model configured to receive and process one or more previous video frames to generate one or more predicted subsequent video frames, wherein the machine-learned video prediction model comprises a convolutional variational auto encoder, and wherein the convolutional variational auto encoder comprises:

an encoder portion comprising one or more encoding cells configured to process the one or more previous video frames to generate an encoded representation of the one or more previous video frames, a dynamic portion comprising a machine-learned model configured to process the encoded representation of the one or more previous video frames to predict, based on the encoded representation of the one or more previous video frames, an encoded representation of the one or more predicted subsequent video frames, and a decoder portion comprising one or more decoding cells configured to process the encoded representation of the one or more predicted subsequent video frames to generate, based on the encoded representation of the one or more predicted subsequent video frames, the one or more predicted subsequent video frames, wherein the machine-learned video prediction model has been trained on training videos, and wherein the training videos were augmented prior to their use to train the machine-learned video prediction model.

19. The one or more non-transitory computer-readable media of claim 18, wherein the convolutional variational auto encoder is configured to receive an action conditioning input that conditions the convolutional variational auto encoder to generate the one or more predicted subsequent video frames depicting a given action represented by the action conditioning input.

20. The one or more non-transitory computer-readable media of claim 18, wherein the training videos were augmented according to one or more augmentation operations, wherein the one or more augmentation operations comprise an augmentation operation randomly applied for a respective training video, wherein the randomization is constant for frames of the respective training video.

21. The one or more non-transitory computer-readable media of claim 20, the augmentation operation selected from: adding noise to training video data, or changing a spatial dimension of training video data.

22. The one or more non-transitory computer-readable media of claim 18, wherein the training videos were augmented according to one or more augmentation operations, wherein the one or more augmentation operations comprise an augmentation operation selected from: adding noise to training video data, or changing a spatial dimension of training video data.

23. The one or more non-transitory computer-readable media of claim 18, wherein the training videos were augmented according to one or more augmentation operations, wherein the one or more augmentation operations comprise, prior to inputting the one or more previous video frames to the machine-learned video prediction model to generate one or more predicted subsequent video frames during the training of the machine-learned video prediction model: selecting a random crop of the one or more previous video frames; and resizing the crop to a target resolution for training.

* * * * *